United States Patent [19]
Portoso et al.

[11] 3,987,642
[45] Oct. 26, 1976

[54] CONTROL VALVE FOR VEHICLE AIR CONDITIONING SYSTEMS

[75] Inventors: Mauro Portoso, Turin; Aldo Tivoli, Casalgrasso (Cuneo); Marco Peruglia, Turin, all of Italy

[73] Assignee: Fiat Societa per Azioni, Turin, Italy

[22] Filed: June 24, 1975

[21] Appl. No.: 589,811

[52] U.S. Cl. ............................ 62/211; 62/217; 236/80 C; 236/84
[51] Int. Cl.² ............................ F25D 29/00; F25B 41/04
[58] Field of Search ............ 62/217, 209, 208, 211; 236/80 C, 84

[56] References Cited
UNITED STATES PATENTS
3,800,551   4/1974   Weibel, Jr. et al. .................. 62/217
3,808,829   5/1974   Peruglia .............................. 62/217

*Primary Examiner*—William E. Wayner
*Attorney, Agent, or Firm*—Sughrue, Rothwell, Mion, Zinn & Macpeak

[57] ABSTRACT

A control valve for controlling refrigerant circulation in a vehicle air conditioning system has an inlet port and an outlet port for connection to the evaporator and the compressor inlet respectively of the system, and a valve controlling communication between these two ports. First control means in the valve body control the valve in dependence upon one or more external controls including manual controls and second control means control the operation of the valve in dependence upon the thermodynamic conditions, such as the temperature, of the refrigerant fluid.

12 Claims, 3 Drawing Figures

CONTROL VALVE FOR VEHICLE AIR CONDITIONING SYSTEMS

BACKGROUND OF THE INVENTION

This invention relates to a control valve for an air conditioning for a motor vehicle air conditioning system. The valve according to the invention is particularly applicable to air conditioning systems of the type comprising a compressor which pressurizes a refrigerant fluid, such as Freon 12, in a condenser, and an evaporator or expansion device in which the fluid is allowed to expand in thermal exchange relationship with the passenger compartment of the vehicle.

In air-conditioning systems of the aforesaid type it is known to provide a valve for controlling the flow of refrigerant fluid: this valve is arranged to cut off, or restrict, the flow of fluid when the thermodynamic conditions of the said fluid are such as to prejudice proper functioning of the system. One such control valve is described in the Applicants' Italian Pat. No. 952850. The valve described in that Patent, whilst achieving its intended purpose, is such that it cannot operate to shut off or restrict the flow of refrigerant fluid; it operates only in the event of increased pressure in the system. Therefore, as improvements and better performances are continually being achieved for airconditioning systems, it is necessary to provide a control valve which operates in response to several parameters, involving the thermodynamic state, not only of the air-conditioning system itself, but also of the passenger compartment, or even in response to direct manual intervention.

An object of the present invention is to provide a control valve which can be operated in response to one or a number of interdependent parameters.

SUMMARY OF THE INVENTION

According to the present invention there is provided a control valve for a vehicle air-conditioning system comprising a compressor, a condenser and an evaporator which in use of the system is arranged in heat exchange relationship with the vehicle compartment to be air conditioned, the control valve controlling the flow of refrigerant fluid in the said system, wherein the control valve comprises a body having an inlet port for connection to the evaporator, an outlet port for connection to the inlet of the compressor, valve means controlling communication between the said two ports, first control means arranged to control the valve means in dependence upon one or more external controls and second control means for controlling the operation of the valve means in dependence upon the thermodynamic conditions of the refrigerant fluid.

BRIEF DESCRIPTION OF THE DRAWINGS

The invention will be further described, by way of non-limiting example, with reference to the attached drawings, wherein.

DETAILED DESCRIPTION OF THE ILLUSTRATED EMBODIMENT

Figure 2:
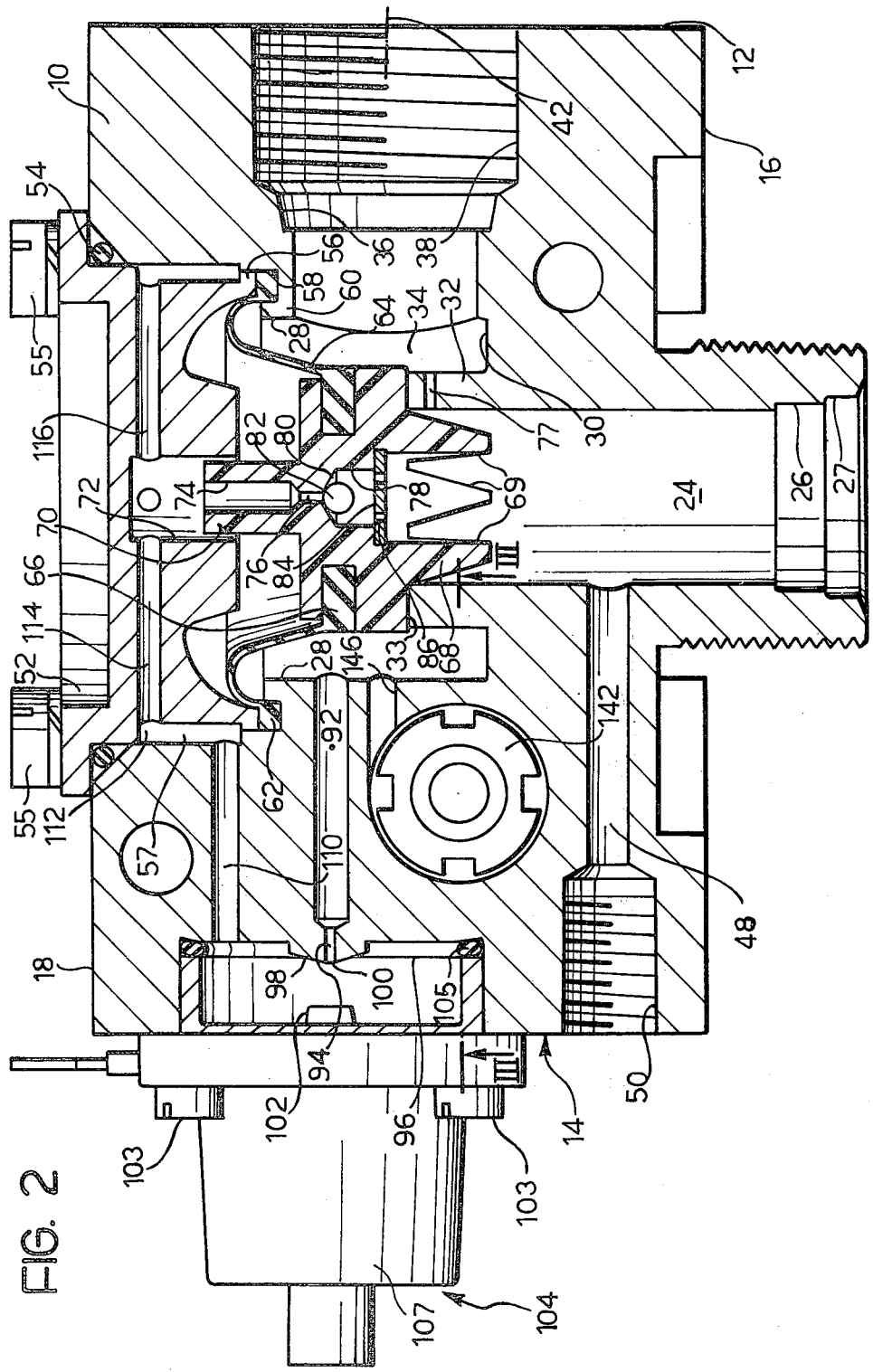
FIG. 2 is a longitudinal section of the body of the control valve according to the invention.
Figure 3:
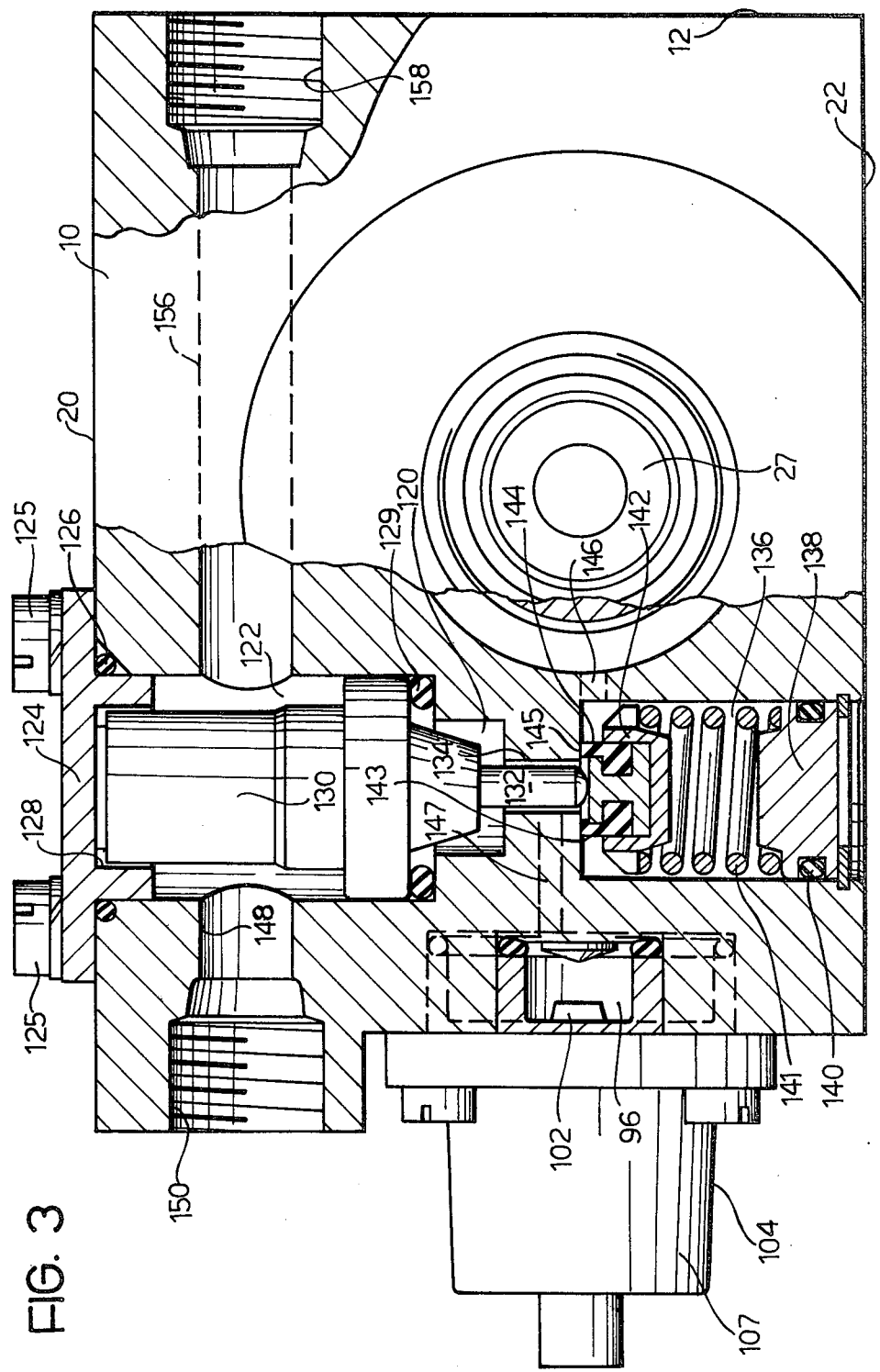
FIG. 3 is a cross section of the control valve taken along the line III—III of FIG. 2.

Referring to FIGS. 2 and 3, reference numeral 10 indicates the body of the valve, having two lateral faces 12 and 14, a front face 16, a rear face 18, a top face 20 and a bottom face 22. The body 10 has an approximately central cylindrical cavity 24 the axis of which is parallel to the faces 12 and 14. The cavity 24 extends from the front face 16 to the rear face 18 and is divided into two portions: a first portion 26 and a second portion 28 of greater diameter than the portion 26. The annular land 30 between these two portions 26 and 28 is formed with an annular upstanding ridge 32 which defines a chamber 34, also annular. The chamber 34 communicates with a duct 36, the axis of which is perpendicular to the axis of the cylindrical cavity 24 and hence to the face 12, which communicates with an internally screw-threaded inlet port 38.

Figure 1:
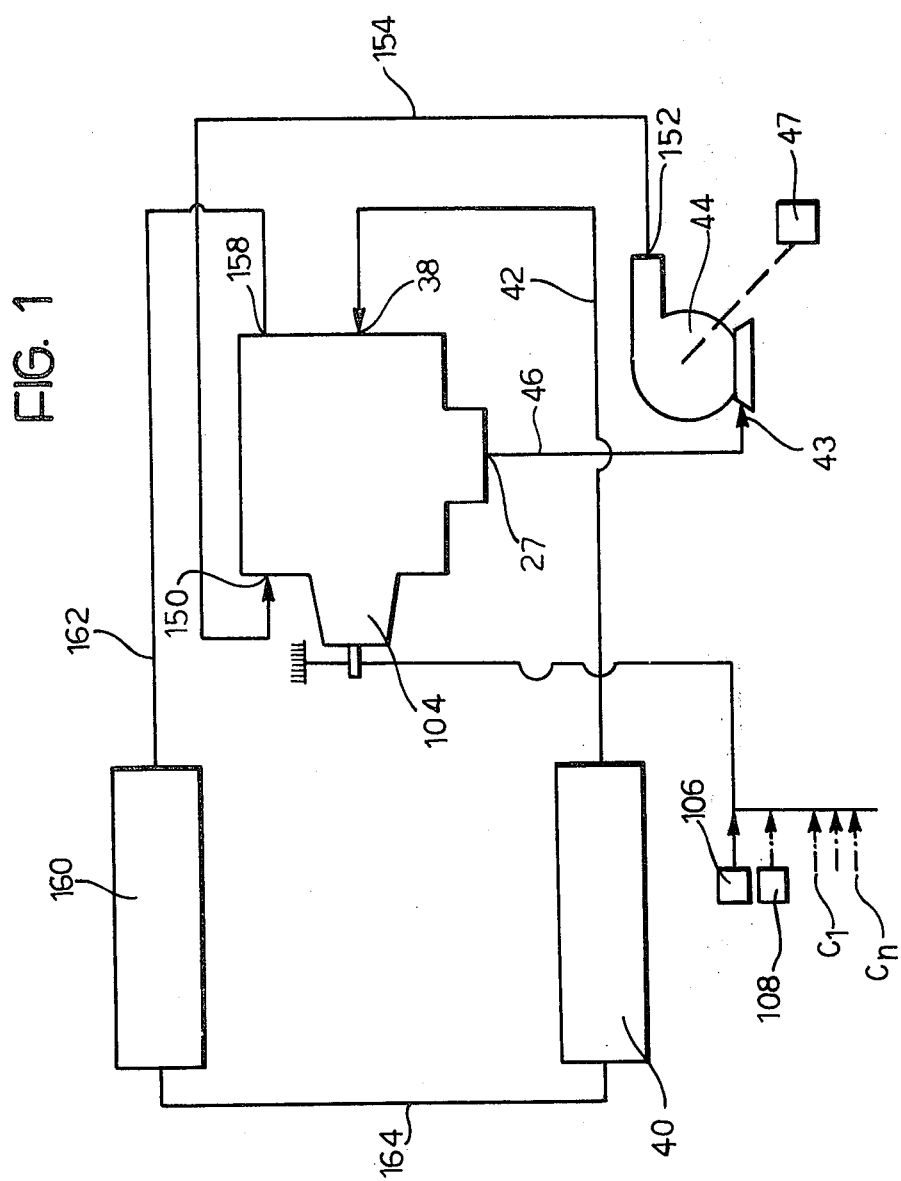
FIG. 1 shows diagrammatically an air conditioning system incorporating a control valve according to the invention.

In use of the valve the port 38 is connected to an evaporator 40 by means of a pipe 42 (FIG. 1). The evaporator 40 is positioned close to the passenger compartment of the vehicle (not shown).

The portion 26 of the cylindrical cavity 24 terminates at its lower end in an externally screw-threaded outlet port 27 which communicates with the inlet 43 of a compressor 44 by means of a pipe 46. The compressor 44, as is known, is driven by, for example, the engine of the vehicle, or by any other means, through a known electromagnetically operated clutch 47. The cavity 24 is also connected through a duct 48 in the body 10 to an internally screw-threaded socket 50, which is used for filling the system with refrigerant fluid, or possibly for the connection of other control devices to the system.

The cavity 24 is closed at its upper end by a cover 52 fitted with a resilient sealing ring 54 of elastomeric material. The cover 52 is fixed to the valve body 10 by means of screws 55. The cover 52 has a cylindrical wall which projects into the cavity portion 28 and which has an external peripheral flange 56 bounding an annular groove 57 which defines with the cylindrical surface of the surrounding body an annular chamber 112. The flange 56 cooperates with an annular seat formed in an internal shoulder 60 within the cavity 24. The flange 56 bears against a peripheral outer rim 62 of a flexible diaphragm 64. A central annular rim 66 of the diaphragm 64 carries a valve member 68 of plastics material. The said valve member 68 cooperates with an annular valve seat 33 defined by an annular surface surmounting the ridge 32 so as to shut off communication between the port 27 and the port 38. The valve member 68 has an upwardly projecting axial stem 70 which slides into a blind bore 72 formed coaxially in the lower surface of the cover 52. The valve member 68 also has an axial through hole 74 which terminates within the stem 70 in a restrictor passage 76 positioned in the central part of the valve member 68. The valve member 68 is formed opposite the stem 70 with four guide fingers 69 and has an axial chamber 78 which communicates with the restrictor passage 76, having a greater diameter than the latter, through a frusto-conical portion 80 which forms a valve seating with which a non-return valve, in this case an obturator ball 82 of plastics material such as polyethylene, cooperates.

The axial chamber 78 in the valve member 68 is separated from the chamber 24 by a baffle plate 84 provided with holes 86 putting the chamber 78 into communication with the chamber 24, so that when the non-return valve ball 82 rests against the baffle plate 84 the bore 72 communicates through the restrictor passage 76 with the chamber 24.

The annular chamber 34 communicates, through a duct 92 and a restrictor passage 94, with a cylindrical control chamber 96 which is coaxial with the duct 92. The restrictor passage 94 communicates with the control chamber 96 through a protuberance 98 which forms a valve seat 100. An obturator plunger 102 is movable by a solenoid valve 104 into sealing engagement with the valve seat 100, the valve 104 being connected to the valve body 10 by means of screws 103 and being sealed relative to the valve body by means of a sealing ring 105.

The winding 107 of the solenoid valve 104 is energisable by various command signals from different remote control points and control elements. The winding 107 can, for example, be energised under control of a thermostatic bulb 106 located within the space to be air conditioned, or under control of a manual push-button switch 108, or by other types of control $Cl, \ldots, Cn$.

The restrictor passage 94 has a diameter greater than that of the restrictor passage 76, for reasons which will be explained below.

At a region near the outer edge of the bottom of the chamber 96 a duct 110 leads from the chamber 96 into the annular chamber 112, which communicates with the axial bore 72 of the cover 52 through radial passages 114, 116.

Between the top and bottom faces 20 and 22 a further internal cavity 120 is made (FIG. 3), the axis of which is perpendicular to the said faces 20 and 22 and which does not intersect the cavity 24. The cavity 120 has three sections of different diameters, including a first section 122, closed at the top face 20 by a closure plate 124 fixed to the body 10 by screws 125, and sealed relative to the body by a sealing ring 126. The closure plate 124 has an internal cylindrical skirt 128 in which there is located a thermosensitive capsule 130, also called a thermostat bulb. The capsule 130 rests upon the bottom of the cavity formed on the internal surface of the closure plate 124 and also bears against an internal shoulder in the cavity 120 through an interposed sealing ring 129. The capsule 130 has a downwardly projecting rigid extension 132 which, when the temperature of the capsule 130 rises, is displaced, as a result of thermal expansion of the capsule 130, into a second section 134 of the cavity 120 which has a smaller diameter than that of the first section 122. The diameter of the second section 134 is such as to permit, with play, passage of the extension 132. The cavity 120 has a third section comprising a chamber 136 of greater diameter than that of the second section 134 which is closed at its lower end (as depicted in FIG. 3) by a plug 138 sealed with respect to the wall of the chamber 136 by an annular seal 140.

In the chamber 136 there slides, with clearance, an obturator valve element 142 the axial position of which depends upon the position of the movable extension 132 of the capsule 130 and upon a compression spring 141 which at its end opposite the valve element 142 bears against the plug 138. The valve element 142 has upon its upper surface, as depicted in FIG. 3, a valve seat 143 of elastomeric material, which is adapted to cooperate with a valve seat 144 formed on a radial shoulder 145 which separates the second cavity section 134 from the chamber 136.

The chamber 136 communicates with the annular chamber 34 through a passage 146, whilst the cavity section 134 communicates with the chamber 96 of the solenoid valve through a passage 147, both the passages 146 and 147 being shown in broken outline in FIG. 3 since they do not lie in the section plane of FIG. 3. The valve 142, 143 therefore controls the relative fluid flow through the said passages 146, 147 and therefore the flow of fluid occurring between the annular chamber 34 and the chamber 96 of the solenoid valve.

Communicating with the chamber 122 is a duct 148, extending perpendicularly to the axis of the chamber 122, which terminates in the lateral face 14 in a port 150. The port 150, which is internally screw-threaded, is in use of the valve connected to the delivery outlet 152 of the compressor 44 by means of a pipe 154. A further duct 156 communicates with the chamber 122 and extends radially with respect to the chamber, placing the latter in communication with an internally screw-threaded port 158 which is in turn connected to a condenser through a pipe 162. The port 150 is therefore permanently connected to the port 158 via the ducts 148 and 156. The refrigerant fluid circuit is completed by a pipe 164 which connects the condenser 160 and the evaporator 40.

OPERATION

Under normal operating conditions, understood as the case where the thermostatic bulb 106 does not intervene in the operation of the valve, the refrigerant fluid is drawn in through the evaporator 40, by operation of the compressor 44 and is delivered through the pipe 42 and the port 38 into the duct 36 in the body of the valve and thence delivered to the annular chamber 34. If the solenoid valve 104 is de-energised, the passage 94 is open, and the fluid passes from the chamber 34 through the duct 92, the restrictor passage 94, the chamber 96, the duct 110, the annular chamber 112, and the radial passages 114 and 116 to the bore 72. The valve member 68 is therefore subjected above and below to two substantially equal pressures and in view of the relative areas of the upper and the lower faces of the valve member the latter will be forced downwards against the valve seat 33, closing off communication between the ports 27 and 38.

The restrictor passage 76, in conjunction with a further optional restrictor passage 77 made in the annular ridge 32 should the passage 76 alone be insufficien, ensures a minimum by-pass flow of fluid, to prevent the lubricating oil of the compressor, which is blown from its flexible seals, being drawn in by the said compressor and circulated in the refrigeration system in this mode of operation.

Under this normal operating condition the obturator valve seal 143 seals against the valve seat 144, cutting off communication between the passages 146 and 147.

When the winding 107 of the solenoid valve 104 is energized by the controls 106, 108, or by any of the controls $Cl, \ldots, Cn$, the obturator plunger 102 of the solenoid valve 104 abuts against the valve seat 100 and cuts off all communication between the chamber 34 and the bore 72 above the valve member 68 and the flexible diaphragm 64. Under these conditions fluid is drawn from the bore 72 through the restrictor passage 76 and the holes 86 of the baffle plate 84; the drop in pressure is such as to lift the valve member 68 so as to allow flow of the refrigerant fluid between the ports 38 and 27 of the valve body 10.

If the pressure of the fluid in the system rises above a predetermined level, to an extent which is not tolerable by the system, there would be a danger of frost formation. Since the temperature of the fluid increases with increasing pressure, the thermostatic capsule 130, which is situated in the cavity 120 in which the refrigerant fluid circulates, expands and the extension 132 pushes the obturator valve seal 143 away from the valve seat 144. This opens communication between the passages 147 and 147 and consequently also between the chamber 34 and the chamber 96, by-passing any blockage of the duct 92 due to engagement of the solenoid valve plunger with the valve seat 100 when the solenoid valve winding 107 is energized. In this case fluid is supplied to both faces of the diaphragm 64, as in the first mode of operation described above, and communicating between the port 27 and the port 38 is cut off, interrupting the flow of refrigerant fluid.

The non-return valve comprising the ball 82 and the perforated baffle plate 84 plays an important role. Since the restrictor passage 76 is absolutely necessary for functioning of the valve, without the valve device 82, 84 the valve member 68 would be subjected to periodic pressure fluctuations, due to the pulsating operation of the compressor 44. Such fluctuations cannot be controlled with any precision, so that pressure supplied to the bore 72 would alternate between high and low values, adversely affecting the operation of the control valve as herein described.

We claim:

1. In a vehicle air conditioning system comprising a compressor, a condenser and an evaporator which in use of the system is arranged in heat exchange relationship with the vehicle compartment to be air conditioned, a control valve controlling the flow of refrigerant fluid in the said system, comprising a body having an inlet of the compressor, valve means controlling communicaton between the said two ports, first control means arranged to control the valve means in dependence upon at least one external control and second control means for controlling the operation of the valve means in dependence upon the thermodynamic conditions of the refrigerant fluid, said valve means comprise a valve seat located between the two ports, a movable valve member coaxial with and cooperating with the valve seat, and a flexible diaphragm supporting the valve member, the combined valve member and diaphragm having different effective areas, such that when both faces of the diaphragm are subjected to equal pressures the valve member contacts the said valve seat so as to cut off communication between said inlet and outlet ports.

2. The control valve defined in claim 1, wherein the surface of the diaphragm facing towards the valve seat is permanently subjected to the pressure of the fluid at the inlet port whilst the other surface of the diaphragm is selectively subjected to the fluid pressure at the inlet port in dependence upon operation of said first and second control means selectively.

3. The control valve defined in claim 2, wherein the first control means comprise a duct permanently connected to the inlet port of the valve, a valve seat terminating said duct, a control chamber within which said seat is located, an obturator cooperating with said valve seat, the said chamber being in communication with the said other surface of the diaphragm, and including a solenoid valve controlling the position of the said obturator, said solenoid valve having a winding which is energisable under external control.

4. The control valve defined in claim 3, wherein the duct connecting the control chamber to the inlet port is perpendicular to the valve seat with which the valve member cooperates, and wherein the control chamber is coaxial with the said duct.

5. The control valve defined in claim 1, wherein the second control means comprise a passage permanently connected to the inlet port, a passage permanently connected to the control chamber, a valve seat between the said passages, a movable obturator valve which cooperates with the said valve seat and which is biased into sealing engagement therewith by resilient biasing means, said second control means controlling axial movement of the obturator valve relative to its seat in dependence upon the temperature of the refrigerant fluid in the control valve.

6. The control valve defined in claim 5, wherein the second control means comprise a thermosensitive capsule which is disposed in contact with the refrigerant fluid flowing through the control valve and a rigid axial extension carried by the capsule and bearing against the obturator valve whereby, if the temperature of the fluid rises beyond a predetermined value the expansion of the capsule causes the extension to displace the obturator valve from its valve seat.

7. The control valve defined in claim 6, including means defining within the body a chamber coaxial with the valve seat of the obturator valve, in which chamber the thermosensitive capsule is disposed, the extension of the capsule passing through a section of an internal cavity of the valve body which is sealed from said chamber containing the capsule and which communicates with said passage permanently connected to the control chamber.

8. The control valve defined in claim 7, including an internal duct with which the chamber containing the capsule communicates, a port communicating with said internal duct, said port in use of the valve being connected to the condenser a further duct communicating with said chamber, and a further port communicating with said further duct, which further port in use of the valve is connected to the delivery outlet of the compressor and wherein said ducts are perpendicular to the axis of the said chamber.

9. The control valve defined in claim 4, wherein the axes of the valve seats cooperating respectively with the valve member, the obturator of the first control means and the obturator valve of the second control means are mutually perpendicular to each other.

10. The control valve defined in claim 1, wherein the valve member is provided with valve means adapted to prevent vibratory movement of the valve member due to pulsating operation of the compressor.

11. The control valve defined in claim 10, wherein the valve member has a through hole with which the said valve means cooperate to prevent the flow of the refrigerant fluid from the outlet port to the inlet port and to allow flow in the opposite direction through the said hole in the valve member.

12. The control valve defined in claim 11, wherein said valve means comprise means defining an internal chamber in the valve member coaxial with said hole, a perforated baffle in said internal chamber, an obturator ball, and a seat formed in said internal chamber with which said obturator ball cooperates.

* * * * *